United States Patent (10) Patent No.: US 7,785,550 B2
Hofmann et al. (45) Date of Patent: Aug. 31, 2010

(54) PROCESS AND DEVICE FOR SEPARATING HYDROGEN FROM GAS FLOWS BY A PRESSURE SWING ADSORPTION PROCESS

(75) Inventors: Karl-Heinz Hofmann, Germering (DE); Paul Leitgeb, Pullach (DE); Ulrike Wenning, Pullach (DE); Hans-joerg Zander, Munich (DE); Werner Leitmayr, Neuburg/Donau (DE)

(73) Assignee: Linde Aktiengesellschaft, Munich (DE)

( * ) Notice: Subject to any disclaimer, the term of this patent is extended or adjusted under 35 U.S.C. 154(b) by 0 days.

(21) Appl. No.: 12/139,168

(22) Filed: Jun. 13, 2008

(65) Prior Publication Data

US 2008/0311015 A1    Dec. 18, 2008

(30) Foreign Application Priority Data

Jun. 15, 2007    (DE)    .................. 10 2007 027 723

(51) Int. Cl.
*C01B 3/00*    (2006.01)
*C01B 3/02*    (2006.01)
*C01B 13/00*    (2006.01)

(52) U.S. Cl. ..................... 423/219; 423/248; 423/580.1

(58) Field of Classification Search ................. 423/219, 423/580.1, 248

See application file for complete search history.

(56) References Cited

U.S. PATENT DOCUMENTS 5,959,190 A * 9/1999 Peinecke et al. ........... 73/25.01
2004/0265215 A1* 12/2004 DeCarli et al. .......... 423/580.1

FOREIGN PATENT DOCUMENTS

| CN | 1903703 | * | 1/2007 |
| DE | 34 27 804 A1 | | 4/1985 |
| DE | 196 25 093 A1 | | 1/1998 |
| EP | 1 033 346 A2 | | 9/2000 |
| EP | 1 736 437 A | | 12/2006 |
| WO | 9703745 | * | 2/1997 |
| WO | WO 2006/097703 A1 | | 9/2006 |

* cited by examiner

*Primary Examiner*—Jerry Lorengo
*Assistant Examiner*—Rebecca Lee
(74) *Attorney, Agent, or Firm*—Crowell & Moring LLP

(57) ABSTRACT

A process for separating hydrogen from a gas flow having an oxygen constituent and including predominantly hydrogen, nitrogen, oxygen, carbon dioxide, carbon monoxide, methane and/or other hydrocarbons, as well as a device for conducting the process, is disclosed. The gas flow undergoes a process to thermally convert oxygen prior to the pressure swing adsorption process.

12 Claims, 1 Drawing Sheet

PROCESS AND DEVICE FOR SEPARATING HYDROGEN FROM GAS FLOWS BY A PRESSURE SWING ADSORPTION PROCESS

This application claims the priority of German Patent Document No. 10 2007 027 723.9, filed Jun. 15, 2007, the disclosure of which is expressly incorporated by reference herein.

BACKGROUND AND SUMMARY OF THE INVENTION

The invention relates to a process for separating hydrogen from a gas flow having an oxygen constituent comprised predominantly of hydrogen, nitrogen, oxygen, carbon dioxide, carbon monoxide, methane and/or other hydrocarbons as well as a device for conducting the process.

The invention is described using the example of separating hydrogen from coke oven gas, but is suitable for separating hydrogen from any gas flow of any composition of the above-mentioned components and is therefore not limited to coke oven gas.

When coke is manufactured in coking plants, for the most part bituminous coal is heated with the exclusion of air. Coke, coke oven gas and tar are generated in the process. The more carbonaceous coke is used mainly in the production of iron. The coke oven gas comprised predominantly of hydrogen, methane and carbon monoxide is used mainly as an industrial fuel according to the prior art. However, coke oven gas has only about half the heating value of natural gas and is frequently contaminated by accompanying substances, which can cause the emission of toxic substances or operating malfunctions. As a result, because of stricter environmental guidelines, efforts are being made to find alternative uses for coke oven gas.

Coke oven gas is often comprised of approx. 60% hydrogen. Among other things, hydrogen is required in large quantities in oil refineries to reduce the sulfur content of middle distillates in what is commonly known as hydrotreaters and to break down different crude oil fractions in so-called hydrocrackers. In addition, hydrogen is used in the reduction of metal oxides, the manufacturing of ammonia, as a propellant, or in fuel cells. European Patent Document No. EP 1033346 describes a prior art process for separating hydrogen from a gas flow, which, in addition to hydrogen, contains predominantly nitrogen, carbon dioxide, carbon monoxide and methane along with the impurities of oxygen and argon.

In the case of a process for pressure swing adsorption according to the prior art, the gas mixture is fed under high pressure to a reactor having an adsorber. Depending upon the prevailing pressure and the adsorber material, the components of the gas mixture are adsorbed by the adsorber material at different intensities. In an ideal case, all components of the gas mixture are adsorbed by the adsorber with the exception of hydrogen. Hydrogen is thus separated from the remaining components with a high level of purity. Regeneration of the adsorber takes place at low pressure by desorption of the bound components, which can then also be withdrawn in a gaseous manner from the reactor. Thus, hydrogen having a high level of purity can be separated from the remaining gaseous components using a pressure swing adsorption process by using several reactors, which adsorb and/or desorb in an alternating manner. By using the process described in EP 1033346, hydrogen with a purity of a maximum of 99.99% can be separated from the remaining gaseous components.

An increased safety risk arises when using this type of process according to the prior art in the case of oxygen constituents in the gas flow of greater than 1% by volume. The oxygen present in the gas mixture is adsorbed to begin with at high pressure in the adsorber, but in the subsequent course of things is again displaced into the gas phase by components that are being adsorbed more powerfully. This produces oxygen enrichment in the adsorber so that an ignitable, explosive mixture is produced in combination with the hydrogen present in the gas. This explosive mixture represents a safety risk in a pressure swing adsorption process according to the prior art.

The present invention is therefore based on the objective of devising a process of the type mentioned at the outset that avoids the formation of an explosive hydrogen-oxygen gas mixture and minimizes the safety risk of this type of process.

DETAILED DESCRIPTION OF THE EXEMPLARY EMBODIMENTS

Figure 1:
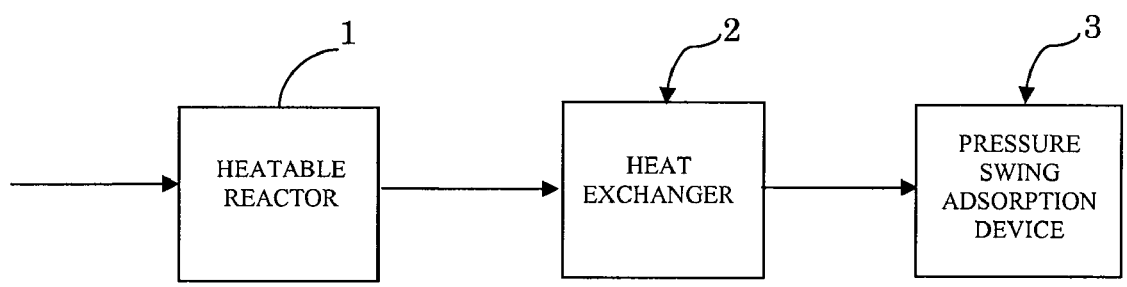
FIG. 1 illustrates an exemplary embodiment of a process and system of the present invention.

In the present invention, a process to thermally convert oxygen without a catalyst is combined with a pressure swing adsorption process for separating hydrogen, wherein the pressure swing adsorption process is conducted after the process to thermally convert oxygen.

By combining a process to thermally convert oxygen without a catalyst with a pressure swing adsorption process, the oxygen content in the gas mixture is already minimized before the pressure swing adsorption process in such a way that an explosive gas mixture of hydrogen and oxygen cannot arise. Processes for thermally converting oxygen have proven to be a very stable and robust technique. Surprisingly, the use of a catalyst can be dispensed with in the process. As a result, the catalytic poisons contained in the gas flow are not able to damage a catalyst necessitating a regeneration of the catalyst and the associated production downtimes. In addition, it has been shown that, when using the inventive process, a subsequent catalytic cleaning of the separated hydrogen can be dispensed with in most cases. The depletion of the oxygen for safety reasons and depletion to achieve the required product purity therefore take place in one step.

By using the inventive process, even gas flows having an oxygen constituent of greater than 1% by volume are also advantageously processed safely by the pressure swing adsorption process.

The process to thermally convert oxygen is preferably conducted at a temperature between 300° C. and 500° C. Oxygen can be converted very well at a temperature of 300° C. to 500° C., mainly into water.

It is advantageous to preheat the gas flow prior to the process for the thermal conversion of oxygen, whereby the gas flow is expediently preheated—via a heat exchanger—in a direction of flow that is inverse to the gas flow in accordance with the process for the thermal reaction of hydrogen. The hot gas flow after the thermal process to convert oxygen must be cooled prior to the pressure swing adsorption process. The thermal energy can be used effectively in this embodiment of the invention by simultaneously preheating the gas flow prior to the thermal process to convert oxygen.

To achieve a very high degree of purity of the separated hydrogen, in another embodiment of the invention, the separated hydrogen undergoes a further process to catalytically remove residual traces of oxygen. Using a downstream catalytic process for separating oxygen can further increase product purity.

In an embodiment of the process and system of the present invention, as can be seen in FIG. 1, a heatable reactor 1 is positioned upstream in front of a device for conducting a pressure swing adsorption process 3.

The reactor is expediently suitable for temperatures between 300° C. and 500° C. In an advantageous embodiment of the invention, a heat exchanger 2 is situated between the reactor 1 and the device for conducting a pressure swing adsorption process 3.

The present invention makes it possible in particular to avoid the development of an explosive gas mixture of hydrogen and oxygen in a pressure swing adsorption process, thereby minimizing the safety risk.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for separating hydrogen from a gas flow having an oxygen constituent comprised predominantly of hydrogen, nitrogen, oxygen, carbon dioxide, carbon monoxide, methane and/or other hydrocarbons, wherein a process to thermally convert oxygen without a catalyst is combined with a pressure swing adsorption process for separating hydrogen, wherein the pressure swing adsorption process is conducted after the process to thermally convert oxygen.

2. The process according to claim 1, wherein gas flows with an oxygen constituent of greater than 1% by volume are processed safely by the pressure swing adsorption process.

3. The process according to claim 1, wherein the process to thermally convert oxygen is conducted at a temperature between 300° C. and 500° C.

4. The process according to claim 1, wherein the gas flow is preheated prior to the process to thermally convert oxygen.

5. The process according to claim 4, wherein the gas flow is preheated via a heat exchanger in a direction inverse to a direction of flow of the gas flow in accordance with the process for the separating of hydrogen.

6. The process according to claim 1, wherein the hydrogen undergoes a further catalytic process to remove oxygen after the process to separate hydrogen.

7. A process for separating hydrogen from a gas flow having an oxygen constituent comprised predominantly of hydrogen, nitrogen, oxygen, carbon dioxide, carbon monoxide, methane and/or other hydrocarbons, comprising the steps of:

thermally converting oxygen in the gas flow without a catalyst in a reactor; and following the thermally converting step, separating hydrogen from the gas flow in a pressure swing adsorption device.

8. The process according to claim 7, further comprising the step of preheating the gas flow prior to the thermally converting step.

9. The process according to claim 8, wherein the step of preheating the gas flow is performed in a heat exchanger by the gas flow following the thermally converting step.

10. The process according to claim 7, wherein the step of thermally converting oxygen in the gas flow prevents an explosive gas mixture of oxygen and hydrogen from forming before the separating hydrogen step.

11. The process according to claim 7, wherein the oxygen content in the gas flow is greater than 1% by volume prior to the thermally converting step.

12. The process according to claim 7, wherein the step of thermally converting oxygen converts the oxygen to water.

* * * * *